Feb. 1, 1955
F. R. FIER
2,701,029
AIR CLEANER
Filed Feb. 2, 1953
2 Sheets-Sheet 2
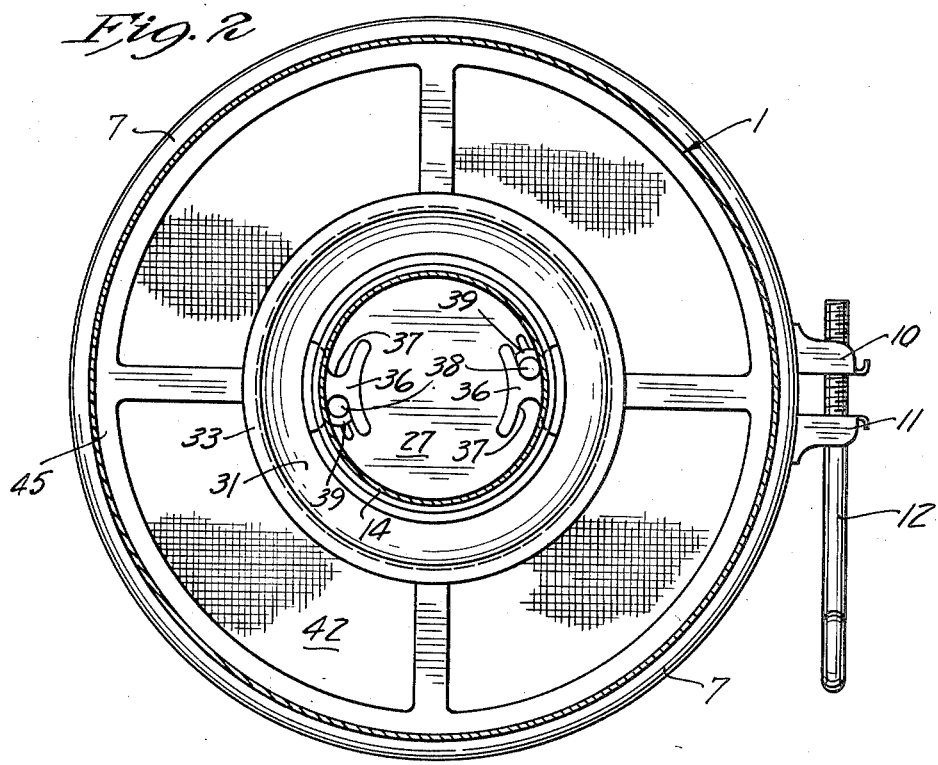
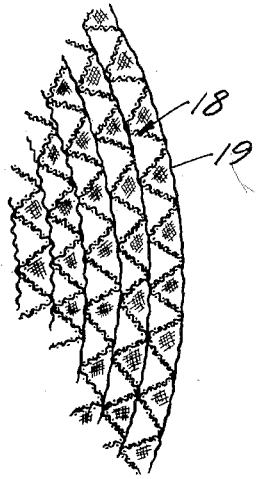
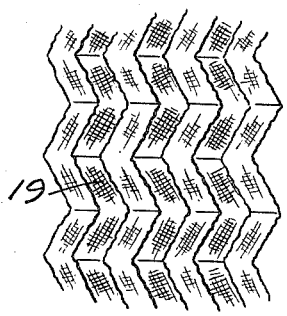
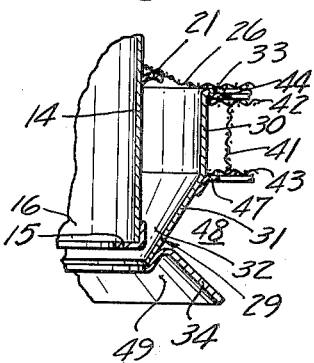
INVENTOR.
Floyd R. Fier
BY
Merchant & Merchant
ATTORNEYS

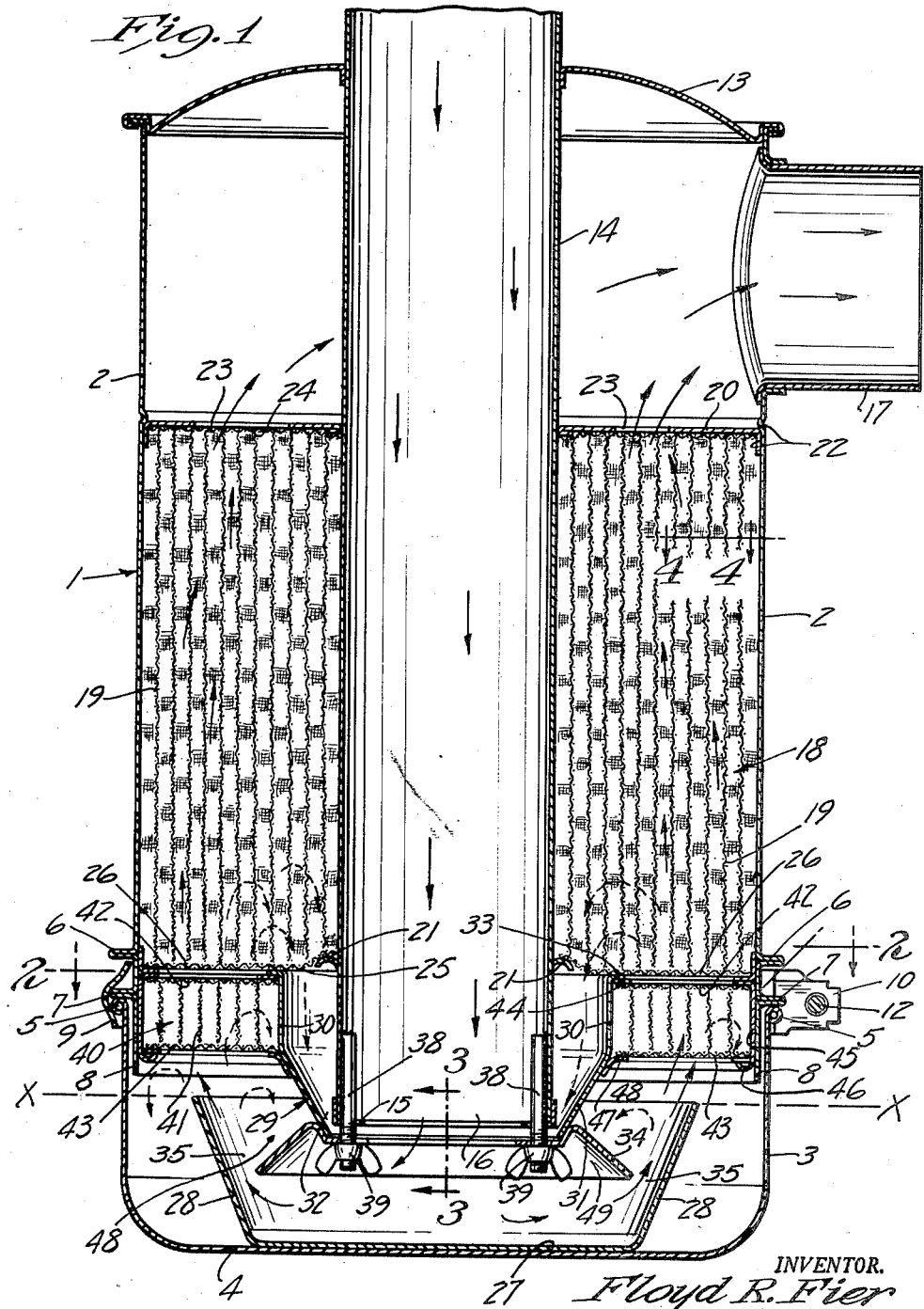

United States Patent Office 2,701,029
Patented Feb. 1, 1955

2,701,029

AIR CLEANER

Floyd R. Fier, St. Paul, Minn., assignor to Donaldson Company, Inc., St. Paul, Minn., a corporation of Minnesota Application February 2, 1953, Serial No. 334,400

4 Claims. (Cl. 183—15)

My invention relates to improvements in air cleaners of the liquid wash type, which contain a body of liquid, usually oil, and which are particularly adapted for use in connection with the air intakes of internal combustion engines, air compressors, and the like.

Air cleaners of this liquid wash type involve a casing defining a liquid well or reservoir in its bottom and an expansion chamber above the well and are usually provided with an air outlet from the upper portion of the expansion chamber and an air inlet conduit discharging downwardly into the liquid well. In most cleaners of this type, a large part of the liquid that is normally in the liquid well under static conditions is induced into the expansion chamber above the well by air passing between the inlet and outlet under operating conditions; in some air cleaners of this type, more or less of a circulation of liquid being maintained between the well and expansion chamber under operating conditions. Two major problems are usually present in this type of air cleaner, to wit, (A) the thorough commingling of air and liquid for the purpose of catching the highest possible percentage of dust particles in the liquid; and (B) the separation of the liquid from the air before the air reaches said outlet.

Air cleaners of the liquid wash type generally may be divided into two classifications as follows: (1) Those employing a relatively tightly packed filter in the expansion chamber thereof between the liquid well and outlet for filtering out such dust as is carried past the washing zone in or adjacent the liquid well and for removing from the air stream liquid that might otherwise be carried to the outlet; and (3) Those liquid body containing cleaners employing relatively very pervious element or elements which usually consist of stacked corrugated wire screens of relatively coarse mesh. Coarse and highly pervious filter elements of this character are less efficient, from an oil trapping point of view, than are the relatively tightly packed filter elements and have much less dust collecting and retaining capacity than do oil soaked filters of the tight packed type.

Tight packed filters of the type defined above, and which usually consist of tightly packed wire, metal shavings, or fibrous materials such as horsehair or moss, have been found to be objectionable because they tend to plug and require relatively frequent servicing under adverse conditions but have been considered as necessary in some instances for the purpose of bringing the overall efficiency of some cleaners up to a necessarily high standard and in other cases have been considered necessary for the purpose of preventing a carry over of oil into the cleaners' outlet. On the other hand, cleaners employing the more coarse and highly pervious filter elements have been objected to on the grounds that more or less liquid, usually oil, would be carried to the outlet of the cleaner thereby gradually diminishing the liquid supply in the cleaner and producing an undesirable wet condition in the intake. An important object of my invention is the provision of an improved air cleaner of the so-called liquid wash or bath type wherein the air cleaning efficiency by liquid washing action within or in the immediate vicinity of the cleaner's liquid reservoir will be greatly improved, and wherein the amount of oil drawn upwardly into the filter element is substantially reduced.

Another important object of the invention is the provision of novel means for directing oil from the filter element to the well or reservoir in a manner which will prevent clogging or plugging of the filter element with oil, thus making possible the use of a relatively dense tight pack filter element.

Another object of the invention is the provision of novel baffle means in the air stream below the filter element, which will create a quiescent zone whereby to further facilitate return of oil to the reservoir or well.

The above and still further highly important objects and advantages of my invention will become apparent from the following specification, appended claims and attached drawings.

Referring to the drawings, which illustrate the invention, and in which like characters indicate like parts throughout the several views:

Fig. 1 is a vertical axial section of an air cleaner built in accordance with my invention;

Fig. 2 is a transverse section taken substantially on the line 2—2 of Fig. 1;

Fig. 3 is a fragmentary detail in section taken substantially on the line 3—3 of Fig. 1;

Fig. 4 is an enlarged fragmentary section of the filter element of my invention taken substantially on the line 4—4 of Fig. 1; and Fig. 5 is a fragmentary view in side elevation of the filter element of Figs. 1 and 4.

In the preferred embodiment of my invention illustrated, an air cleaner is shown as comprising a vertically disposed generally cylindrical casing 1 comprising an upper casing section 2 and a lower cup-like casing section 3 having a bottom wall 4 and having an outturned bead 5 at its marginal edge. The upper casing section 2 is formed to provide a pair of vertically spaced radially projecting circumferential flanges 6 and 7 and an annular skirt 8 extending below the lower flange 6. Said lower flange 6 is adapted to abut the bead 5 of the lower casing section 3 about the entire circumference thereof, and said bead and lower flange 6 are maintained in abutting relationship by a clamping band 9, which at its opposite ends is formed to provide lugs or ears 10 and 11, the former of which may be assumed to be screw threaded to receive the threaded end of a clamping screw 12 which extends through a suitable aperture in the lug 11 whereby to tighten the clamping band 9 about the flange 7 and bead 5 and secure the lower casing section 3 to the upper section 2.

The upper end of the upper casing section 2 is closed by a cover plate 13 through the center which carries at its center a downwardly extending air inlet tube 14. The lower discharge end of the inlet tube 14 is disposed below the level of the bottom of the casing section 2 and is contained within the interior lower casing section 3. Preferably and as shown, passage of air downwardly through the inlet tube 14 is restricted by a flanged annular plate 15 welded or otherwise rigidly secured to the lower end 16 of the inlet tube 14. An air outlet tube 17 communicates with the interior of the casing section 2 adjacent the cover plate 13 thereof.

The upper casing section 2 and the inlet tube 14 define therebetween an expansion chamber 18 in which is contained a relatively dense dust and oil intercepting means in the nature of a filter element 19. The filter element 19 is preferably made from a sheet of relatively fine mesh wire screen corrugated in a herringbone arrangement and rolled spirally around the inlet tube 14 between an upper retaining plate 20 and a circumferentially extended flange 21 welded or otherwise rigidly secured to the inlet tube 14. As shown in Fig. 1, the outer marginal edge of the retaining plate 20 is held against upward movement with respect to the casing 1 by engagement with a circumferentially extended indented portion 22 formed in the casing section 2 below the outlet tube 17. The plate 20 defines an eccentric annular opening 23 through which cleaned air passes from the filter element 19 to the air outlet 17. The purpose of the eccentric annular opening 23 is fully set forth in the United States Letters Patent 2,006,927 issued to Wilfred W. Lowther on July 2, 1935. A pair of relatively flat annular screens 24 and 25 are interposed between the upper and lower ends respectively of the filter element 19 and the plate 20 and flange 21. The outer peripheral portion of the lower end of the filter element 19 is further supported by a circumferentially extended flange 26 that is welded or otherwise rigidly secured to the casing section 2, see Fig. 1.

The lower discharge end 16 of the air inlet tube 14 terminates within and below the upper marginal edge of a cup-shaped receptacle 27 welded or otherwise rigidly secured to the bottom wall 4 of the well forming casing section 3 concentric therewith. The receptacle 27 is formed with an upwardly flaring or inverted frusto-conical side wall 28 which tends to direct air flowing downwardly through the inlet tube outwardly and upwardly toward the radially outer portions of the expansion chamber 18.

Concentric with the lower end portion of the air inlet tube 14 is a funnel element 29 having an upper cylindrical wall portion 30 and a lower downwardly tapering wall portion 31 that terminates at its lower end in downwardly spaced relation to the lower discharge end 16 of the air inlet tube 14 whereby to provide an annular air return passage 32. The upper end of the funnel element 29 is formed to provide a circumferentially extended radially outwardly projecting flange 33 that is adapted to abut the screen 25 radially outwardly of the supporting flange 21 therefor. Suitably anchored, as by welding or the like, to the lower end of the tapering wall portion 31 is a circumferentially extended baffle 34 that is preferably frusto-conical in form and which extends downwardly and outwardly into the annular air passage defined by the side wall portion 28 of the cup-like receptacle 27 and the tapering side wall portion 31 of the funnel element 29, said air passage being indicated at 35. The baffle 34 is provided with a pair of diametrically opposed mounting flanges 36 which define circumferentially opening hooks 37 which are adapted to engage a pair of circumferentially spaced studs or the like 38 welded or otherwise secured to the lower end portion of the air inlet tube 14 and which extends downwardly therefrom, see Figs. 1 and 2. The funnel element 29 and baffle 34 are anchored in place by a pair of wing nuts or the like 39 screw threaded on the downwardly projected threaded end portions of the studs 38. The construction of the receptacle 27 and the baffle 34 is such that the annular air passage 35 is substantially restricted. However, the restricted passage area between the side wall portion 28 of the receptacle and the outer peripheral edge of the baffle 34 is greater than that of the air inlet defined by the inlet tube 14.

A second filter element 40 is made up of a winding of corrugated sheet screen 41 and upper and lower annular plate screens 42 and 43 respectively. A spider-like retaining plate 44 is interposed between the upper screen 42 and the flange 33 of the funnel element 29 and is formed to provide a cylindrical outer wall portion 45 which is snugly fitted in the skirt 8 on the upper housing section 2. The lower marginal edge portion of the cylindrical wall portion 45 is inturned to provide a supporting flange 46 for the bottom screen element 43 adjacent its outer peripheral edge. The inner peripheral edge portion of the lower screen 43 and the filter element 40 is carried by a supporting flange 47 welded or otherwise rigidly secured to the funnel element 29. Preferably and as shown, the filter element 40 is upwardly spaced from the normal static level of oil in the well formed by the casing section 3, said normal oil level being even with the top of the receptacle 27 and as indicated by the broken line XX in Fig. 1. It will be further noted that the lower discharge end of the inlet tube 14 is below said normal oil level as is the baffle 34 and the lower end of the oil return passage 32 between the funnel element 29 and the lower end portion of the tube 14.

As air moves downwardly through the inlet tube 14, it displaces oil within the well and forces the same radially outwardly and upwardly toward the cylindrical outer wall of the casing 2 and into the second filter element 40, during which time most of the dust particles in the air are caught and retained by the oil. Inasmuch as the baffle 34 projects into the passage 35, said baffle provides thereabove a quiescent zone 48, the funnel element 29 being disposed within said quiescent zone. As air moves upwardly and outwardly through the passage 35, some of the oil carried thereby adjacent the quiescent zone 48 will drop downwardly upon the baffle 34 and flow back into the air stream. Other portions of the oil will fall into the well radially outwardly of the receptacle 27 and overflow back into the air stream at the marginal edge of the receptacle 27. Oil that is carried up into the filter elements 40 will gravitate toward the quiescent zone 48 and toward the skirt 8 from whence it will flow back toward the air stream. Oil which is carried up into the relatively dense filter element 18 will gravitate radially inwardly toward the funnel element 29 and flow downwardly through the annular passage 32 from whence it will again enter the air stream. The air stream through the cleaner is indicated by full line arrows whereas the path of oil flow is indicated by dotted line arrows. The establishment of the quiescent zone above the annular baffle 34 permits the use of an efficient relatively tight packed filter element which will not become clogged with oil even during extended periods of use. Furthermore, this arrangement assures a high degree of cleaning efficiency and permits the use of a cleaner of a smaller size for a given work capacity. Inasmuch as the restricted passage area 35 is greater than the area of the inlet passage, the velocity of air through the passage 35 is not so great that oil will be carried thereby into the filter element 18 to a distance where gravitation thereof downwardly into the funnel element 29 will be rendered difficult. It should be noted that during the operation of the cleaner, sufficient oil drains into the funnel element 29 to keep the same partially filled so that air from the inlet tube does not move upwardly through the oil return passage 32. The under surface of the baffle 34 partially defines a dead air space 49 during the flow of air through the cleaner. This dead air space or zone further enhances the drainage of oil downwardly through the return passage 32 and aids materially in the washing of air entering the well from the inlet tube 14.

My invention has been thoroughly tested and found to be completely satisfactory for the accomplishment of the objectives set forth; and while I have shown and described a commercial embodiment of my novel air cleaner, it will be understood that the same is capable of modification without departure from the spirit and scope of the invention as defined in the claims.

What I claim is:

1. An air cleaner comprising a casing defining an oil well and having an air inlet and an air outlet, relatively dense dust and oil intercepting means located in said casing between said oil well and said air outlet, a cup-shaped receptacle in the bottom of said well in spaced opposed relation to the discharge end of the air inlet, said receptacle having an upwardly flaring side wall extending above the level of the discharge end of the inlet whereby to direct dust laden air and oil displaced thereby from said receptacle upwardly and outwardly toward the side wall of the casing, a funnel element underlying said intercepting means and concentric with said inlet, said funnel element terminating at its lower end in downwardly spaced relation to the discharge end of the inlet and defining therewith an annular oil return passage, said funnel and receptacle defining an annular air passage radially outwardly of said oil return passage, and a circumferentially extended baffle providing a restriction in said annular air passage below the level of the top of said receptacle, the restricted passage area being greater than that of said air inlet, said baffle causing a dead air space to be created thereabove and therebelow during operation of the cleaner whereby to facilitate return of oil from the intercepting means to the receptacle.

2. An air cleaner comprising a casing defining an oil well and having an air outlet, an air inlet tube extending axially of said casing and terminating at its lower discharge end in said well above the bottom thereof, a relatively dense filter element located in said casing between the oil well and said outlet, a cup-shaped receptacle in the bottom of said well in spaced opposed relation to the discharge end of said air inlet tube, said receptacle having an upwardly flaring side wall extending above the level of the discharge end of the inlet whereby to direct dust laden air and oil displaced thereby from said receptacle upwardly and outwardly toward the side wall of the casing, a funnel element detachably secured to the lower discharge end of the inlet tube and concentric therewith, said funnel element underlying said filter element and terminating at its lower end in downwardly spaced relation to the discharge end of the inlet tube and defining therewith an annular oil return passage, said funnel and receptacle defining an annular air passage radially outwardly of said oil return passage, and a circumferentially extended baffle on said funnel providing a restriction in said annular air passage below the level of the top of said receptacle, the restricted passage area being greater than that of said inlet tube, said baffle causing a dead air space to be created thereabove and therebelow during operation of the cleaner whereby to facilitate return of oil from said filter element to the receptacle.

3. The structure defined in claim 2 in which said baffle is frusto-conical in form and extends downwardly and outwardly from said funnel element adjacent its lower end.

4. The structure defined in claim 2 in which said funnel element extends upwardly to and has abutting engagement with said filter element, and in further combination with a second filter element carried by and encompassing said funnel element in upwardly spaced relation to the static level of liquid in said well.

References Cited in the file of this patent

UNITED STATES PATENTS

| | | |
|---|---|---|
| 2,280,417 | Lundberg et al. | Apr. 21, 1942 |
| 2,337,728 | Acton | Dec. 28, 1943 |
| 2,622,695 | Deffenbaugh | Dec. 23, 1952 |
| 2,627,935 | Beach | Feb. 10, 1953 |